United States Patent
Nickel

(10) Patent No.: US 6,574,563 B1
(45) Date of Patent: Jun. 3, 2003

(54) METHOD FOR PROCESSING TIME LAPSED SEISMIC DATA SIGNALS

(75) Inventor: Michael Nickel, Stavanger (NO)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/719,081

(22) PCT Filed: Jun. 18, 1999

(86) PCT No.: PCT/IB99/01144

§ 371 (c)(1),
(2), (4) Date: Dec. 7, 2000

(87) PCT Pub. No.: WO99/67660

PCT Pub. Date: Dec. 29, 1999

(30) Foreign Application Priority Data

Jun. 25, 1998 (GB) .............................................. 9813760

(51) Int. Cl.⁷ ................................................. G01V 1/28
(52) U.S. Cl. ........................................... 702/14; 702/17
(58) Field of Search ............................. 702/14, 16, 17, 702/18; 367/73

(56) References Cited

FOREIGN PATENT DOCUMENTS

| GB | 2317451 | * | 3/1998 |
| WO | 9627141 | * | 9/1996 |
| WO | 9811455 | * | 3/1998 |

* cited by examiner

*Primary Examiner*—Donald E. McElheny, Jr.
(74) *Attorney, Agent, or Firm*—David S. Figatner

(57) ABSTRACT

A non-rigid method of matching two (12, 14) or more sets of seismic data signals obtained from the same subsurface area involving the steps of decomposing (20) the sets of seismic data signals into sample sets, generating displacement vectors (26) indicating directions and amounts samples from one sample set may be translated to better match samples from the other sample set, and translating (30) samples along the displacement vectors to produce a seismic image of the subsurface area. This method is particularly adapted for use in analyzing time-lapsed seismic images of petroleum reservoirs to monitor the movement of fluids within the reservoirs.

20 Claims, 6 Drawing Sheets

US 6,574,563 B1

METHOD FOR PROCESSING TIME LAPSED SEISMIC DATA SIGNALS

BACKGROUND OF THE INVENTION

The present invention relates to a method of processing two or more sets of seismic data signals obtained from the same subsurface area and in particular to a non-rigid method of matching sets of seismic data signals from the same subsurface area. This method is particularly adapted for use in analyzing time-lapsed seismic images of petroleum reservoirs to monitor the movement of fluids within the reservoirs.

Seismic data signals are collected to remotely sense subsurface geologic conditions, particularly in connection with the exploration for and production of hydrocarbons such as oil and natural gas. To gather seismic data signals, acoustic sources such as explosives, airguns, or vibrators are typically used to produce an acoustic pulse that is transmitted through the subsurface geologic formations. Changes in acoustic impedance between different geologic layers cause a portion of the acoustic energy to be reflected and returned toward the earth's surface. These reflected signals are received by seismic sensors and are processed to create images of the subsurface geology.

Often two or more sets of seismic data signals are obtained from the same subsurface area. These sets of seismic data signals may be obtained, for instance, by conducting two or more seismic surveys over the same subsurface area at different times, typically with time lapses between the seismic surveys varying between a few months and a few years. In some cases, the seismic data signals will be acquired to monitor changes in subsurface reservoirs caused by the production of hydrocarbons. The acquisition and processing of time-lapsed three dimensional seismic data signals over a particular subsurface area (commonly referred to in the industry as "4D" seismic data) has emerged in recent years as an important new seismic prospecting methodology.

The purpose of a 4D seismic survey is to monitor changes in the seismic data signals that can be related to detectable changes in geologic parameters. These (not necessarily independent) geologic parameters include fluid fill, propagation velocities, porosity, density, pressure, temperature, settlement of the overburden, etc. Of primary interest are changes taking place in the hydrocarbon reservoir zones of the imaged subsurface volume. Analyzing these changes together with petroleum production data assists the interpreter in understanding the complex fluid mechanics of the system of migration paths, traps, draining or sealing faults making up the hydrocarbon reservoir. This provides information regarding how to proceed with the exploitation of the field: where to place new production wells to reach bypassed pay zones and where to place injectors for enhanced oil recovery. This helps to produce a maximum quantity of hydrocarbons from the reservoir at a minimum of cost.

An important precondition to being able to map detectable changes of geological parameters is that the sets of seismic data signals, which have been acquired at different time instances or by using different acquisition methods, must be calibrated so they match each other. The phrase "match each other" in this context means that images of the seismic data signals reflected from places where no geological parameter changes have taken place must appear (virtually) identical in the different seismic data signal sets. In reality, this ideal situation is never met due to the limited repeatability of multiple state-of-the-art seismic surveys. Those familiar with marine seismic surveying know that navigating the surveying vessel and, more particularly, navigating the seismic source(s) and the streamers with the recording hydrophones can be repeated only with limited accuracy due to weather and tidal conditions. Further, changes in the system responses of the acquisition system are possible due to natural variability of the airguns or when sources or streamers have to be exchanged because of a defect. Other changes can be introduced due to different types of acquisition equipment, changes in data acquisition parameters, etc. Differences between the sets of seismic data signals that are attributable to noise, such as acquisition or processing artifact effects, make comparisons of images of the sets of seismic data signalsextremely difficult. These differences also reduce the confidence the interpreter is likely to have that the observable changes are due to changes in geologic parameters rather than noise such as acquisition or processing artifact effects.

Conventional methods for attempting to address these types of differences include compensating for changes in acquisition parameters or environmental conditions by appropriately interpolating, linear filtering and scaling the seismic data signals. Even when these compensation techniques have been employed, however, significant differences between images obtained from the sets of seismic data signals can often be observed that can be attributed solely to noise such as acquisition or processing artifact effects, not changes in the underlying geologic parameters.

Similar problems exist when attempting to compare images of different types of seismic data signals obtained from a particular subsurface area, such as seismic data signals associated with different seismic energy transmission modes (such as P-P and P-S transmission modes), seismic data signals acquired through the use of different types of seismic sensors (such as geophones and hydrophones), or seismic data signals acquired through the use of seismic sensors that simultaneously sense the orientation of the seismic energy (such as multi-component seismic sensors). At times, different types of seismic data signals that have been obtained simultaneously during a seismic survey of a particular subsurface area will show differences that can only be attributed to noise such as acquisition or processing artifact effects.

It is an object of the present invention to provide an improved method of processing seismic data signals that produces a seismic image of the subsurface area that is more readily comparable to an image obtained from a reference set of seismic data signals.

An advantage of the present invention is that the seismic image of the subsurface area allows changes in geologic parameters to be more readily detected Another advantage of the present invention is that differences between the seismic image of the subsurface area and the image obtained from the reference set of seismic data signals that are attributable to noise such as acquisition or processing artifact effects are often substantially attenuated.

A further advantage of the present invention is that the matching occurs locally rather than globally, thus providing the method an opportunity to properly produce a seismic image of a petroleum reservoir even when seismic data signals received from overburden above the petroleum reservoir may be corrupted.

SUMMARY OF THE INVENTION

The present invention relates generally to the processing of seismic data signals and more particularly to a non-rigid method of matching sets of seismic data signals obtained from the same subsurface area. In one embodiment, the method involves the steps of decomposing the sets of seismic data signals into sample sets, generating displacement vectors indicating the directions and amounts samples from the second sample set may be translated to better match samples from the first sample set, and translating samples from the second sample set along the displacement vectors to produce a seismic image of the subsurface area. This method is particularly adapted for use in analyzing time-lapsed seismic images of petroleum reservoirs to monitor the movement of fluids within the reservoirs. The invention and its benefits will be better understood with reference to the detailed description below and the accompanying figures.

DETAILED DESCRIPTION OF THE INVENTION

Figure 1:
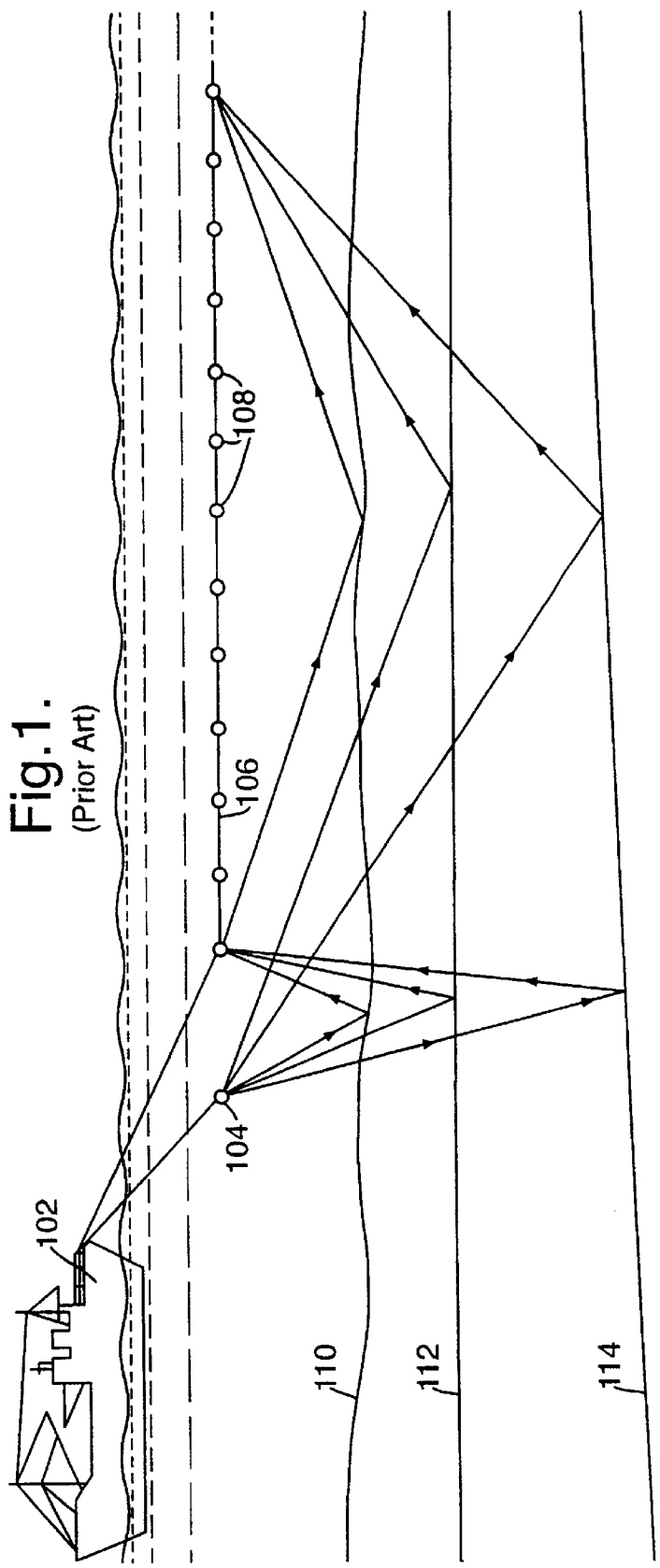
FIG. 1 is a schematic diagram of the process of obtaining seismic data signals from a subsurface area in a marine environment.

FIG. 1 shows the conventional process of obtaining seismic data signals in a marine environment. A seismic survey vessel 102 is used to tow a seismic source, such as an airgun 104, and a plurality of seismic sensors carried on a streamer 106. The streamer 106 contains a plurality of hydrophones 108 which sense acoustic impulses and transmit the seismic data signals, referred to as seismic traces, to the seismic survey vessel 102 where they are typically digitized and recorded. The airgun 104 produces a series of acoustic pulses, a portion of which are partially reflected by the sea bed 110 and a portion of which penetrate through the sea bed and are reflected by boundaries 112 and 114 between the geologic layers have differing acoustic impedances. Often two or more streamers 106 will be towed behind the seismic survey vessel 102 and a three dimensional set of seismic data signals will be obtained. The process shown in FIG. 1 is well known in the art and, in and of itself, forms no part of the present invention.

Figure 2:
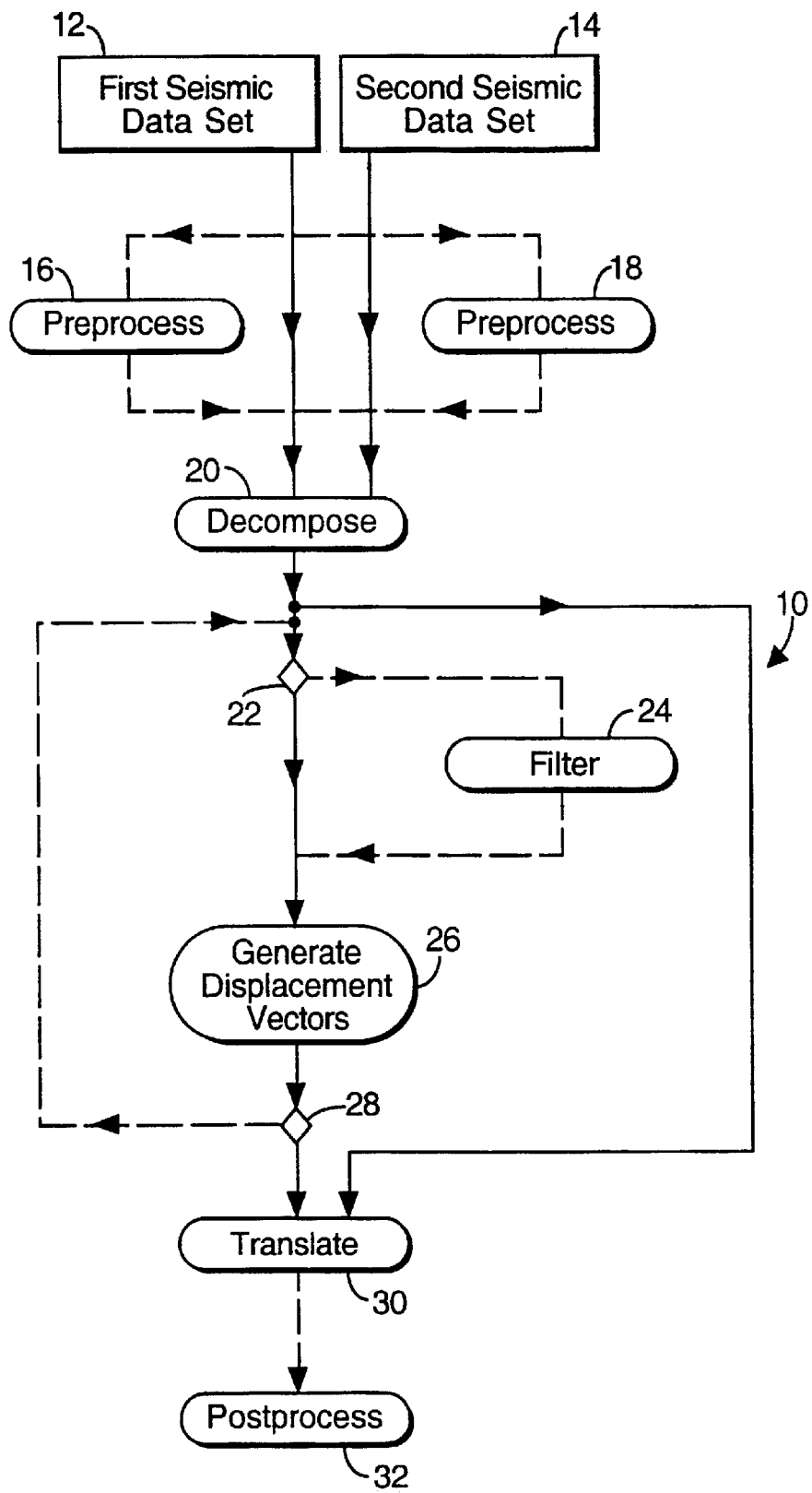
FIG. 2 is a process flow diagram showing steps associated with processing seismic data signals in accordance with the current invention.

Referring now to FIG. 2, there is provided a process flow diagram showing processing steps associated with a preferred embodiment of the matching process in accordance with the present invention, generally referred to as reference number 10. The matching process 10 can be used to more closely match two or more sets of seismic data signals obtained from the same subsurface area in accordance with the present invention.

A first seismic data signals set 12 and a second seismic data signals set 14 are initially obtained from the same subsurface area, such as by using the marine seismic data signal acquisition process shown in FIG. 1. It should be understood that although marine seismic data signals are used in the description of the preferred embodiment, this is not a limitation of the present invention. The matching procedure applies equally well to land and transition zone seismic data signals. In the same sense, the invention also comprises matching of more than two seismic data signal sets or matching of different types of seismic data signals.

After acquisition, the first and second seismic data signal sets 12 and 14 may be subjected to preprocessing procedures 16 and 18, which may include amplitude scaling, bandpass filtering along seismic traces, lateral interpolation or binning, multiple suppression, statics reduction, and time or depth migration with either a pre-or poststack migration scheme.

Often one of the sets of the seismic data signals, typically the "first" set (which will often be acquired earlier than the "second" set), will have already been processed by a certain seismic data processing scheme and it will not be additionally preprocessed in connection with the inventive method (i.e. preprocessing step 16 will be bypassed) The other set of seismic data signals, typically the "second" set (which is often acquired later than the "first" set), will then be subjected to two groups or types of preprocessing procedures. The first group of preprocessing procedures will consist of procedures intended to duplicate the processing procedures performed on the other set of seismic data signals. The second group of preprocessing procedures will consist of procedures intended to compensate for known differences between the acquisition characteristics or parameters of the different data sets. These procedures may include, for instance, calibration steps associated with matching the frequency responses of the seismic source signature and of the receiver geophones or hydrophones when they are known to be different between the two vintages of seismic data signals, or procedures intended to compensate for known differences in source and/or receiver positions.

The two sets of seismic data signals (which may or may not have been preprocessed) are then decomposed into sample sets in decomposition step 20. If 2D sets of seismic data signals are being decomposed, the sample sets can be thought of as pixel sets. If 3D sets of seismic data signals are being decomposed, the sample sets can be thought of as volume element sets or voxel sets.

In the 2D embodiment, this may be accomplished by scanning through a first three dimensional cube of seismic data signals and extracting a particular section from this first data set and then scanning through a second three dimensional cube of seismic data signals and extracting the same section (i.e. having the same geographical coordinates as the first section) from this second data set. Often a migrated section from the earliest acquired set of seismic data signals will serve as the first data set (i.e. the reference data set), although this is not a limitation of the present invention.

Figure 3:
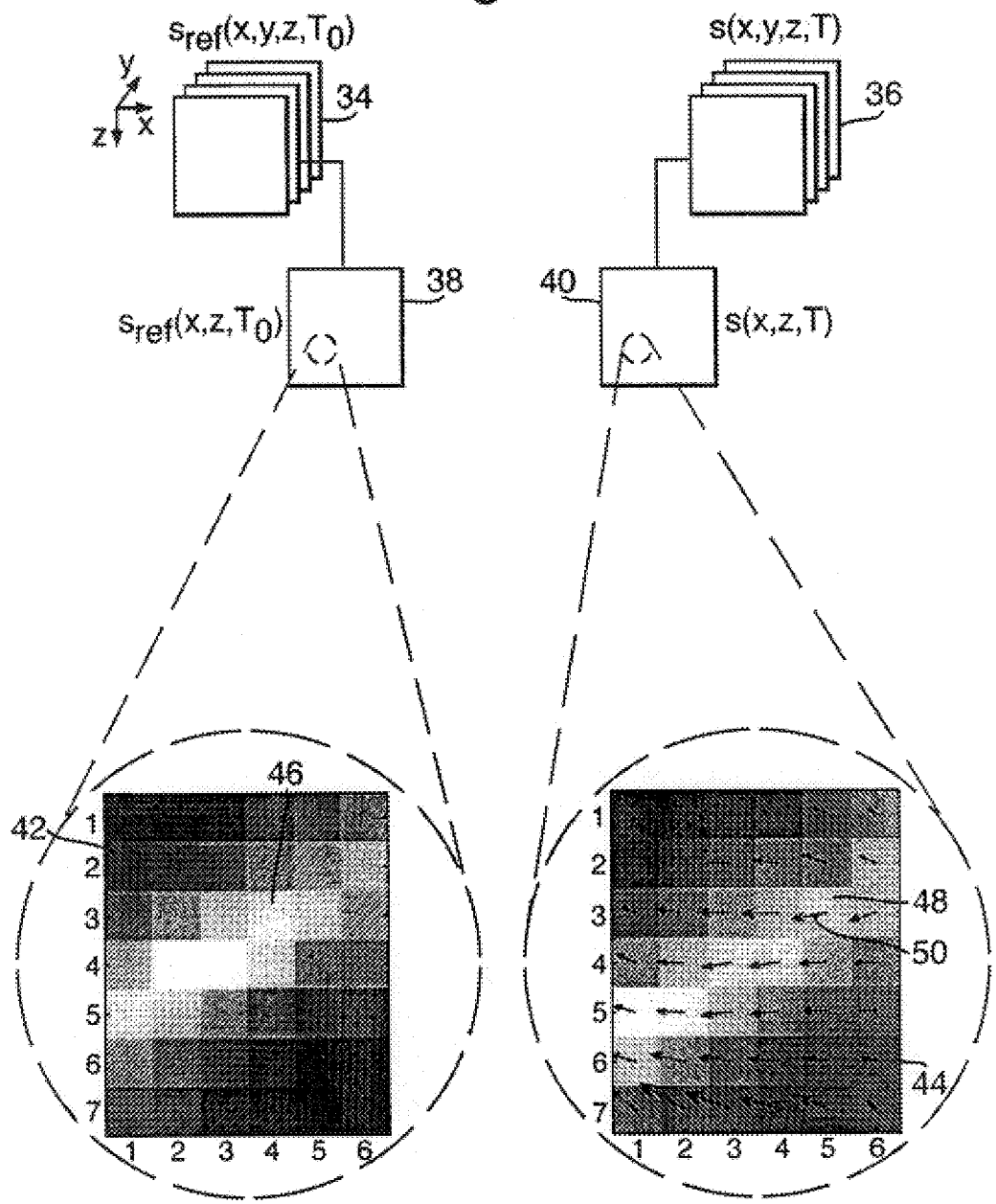
FIG. 3 is a block diagram showing how the seismic data signals may be decomposed into sample sets.

The decomposition process in the 2D embodiment of the present invention is shown in more detail in FIG. 3. In FIG. 3, a first three dimensional set of seismic data signals 34 and a second three dimensional set of seismic data signals 36 that have been obtained from the same subsurface area are shown. A first section 38 extracted from the first set of seismic data signals 34 is shown as well as a second section 40 extracted from the second set of seismic data signals 36. The first section 38 and the second section 40 represent 2D views of the 3D subsurface area surveyed by the first three dimensional set of seismic data signals 34 and the second three dimensional set of seismic data signals 36. While the first section 38 and the second section 40 are intended to represent seismic data signals from precisely the same subsurface area, it should be understood that references herein to "the same subsurface area" are more properly understood as being references to approximately or generally the same subsurface area (i.e. areas having very similar subsurface geologic features). There is a certain acknowledged degree of error incorporated into all seismic data acquisition field position measurements and the inventive method is capable of coping with these errors and similar types of positioning differences.

It should be noted that it is of no importance for the 2D embodiment of the present invention whether the extracted sections correspond to an inline section, a crossline section, a curvilinear or random section, a time slice, a time horizon or any other type of 2D view of the seismic data volumes. It is only assumed that the two extracted sections represent generally the same geology and that the same reflectors have more or less the same signal strength in the corresponding sections. The accuracy of the equal signal strength assumption will depend on the previous preprocessing steps and will influence the result obtained by the non-rigid matching process 10.

The first section 38 and the second section 40 are then decomposed into a first sample set 42 and a second sample set 44, respectively, portions of which are shown in FIG. 3. Typically, each of the samples will have a depth dimension increment equal to the database sampling interval of the seismic data signals in the depth (z) direction (in either time or distance). In a database used by the Applicant, for instance, the seismic data signals are stored at a 4 millisecond depth sampling interval. Similarly the samples typically have a horizontal dimension equal to the database sampling interval of the seismic data signals in the horizontal (x) direction, which may, for instance, be 25 meters to 50 meters in the database used by the Applicant. Each sample's greyscale intensity in FIG. 3 represents the instantaneous amplitude of the seismic data signals at that sample location, although it could represent any characteristic or attribute of the seismic data signals that is being analyzed or interpreted.

Although FIG. 3 shows the 2D embodiment of the present invention, it should be understood that the inventive method can easily be extended to 3D by utilizing a horizontal (y) direction component, which may similarly be equal to the database sampling interval of the seismic data signals in the (y) direction.

The decomposition step 20 establishes the granularity or coarseness of the seismic data signals images that can be obtained by the matching process 10. Often the sets of seismic data signals will be decomposed into sample sets that identically correspond to the coordinate sampling intervals of the database or recording media the seismic data signals are stored in. It is also possible to decompose the seismic data signals into sample sets with sample dimensions larger than these sampling intervals (such as by averaging all of the database samples located within a sample location to assign a value to that particular sample location) or to decompose the seismic data signals into sample sets with sample dimensions smaller than these sampling intervals (such as by interpolating between database samples to assign values to sample locations between the locations of the database samples).

Using the first sample set 42 and the second sample set 44 as input, the matching process 10 generates a displacement vector 50 that indicates how a particular sample 48 from the second sample set 44 must be translated in order to better match a sample 46 from the first sample set 42. This process is then repeated for all of the samples in the first sample set 42 and the second sample set 44.

Figure 4:
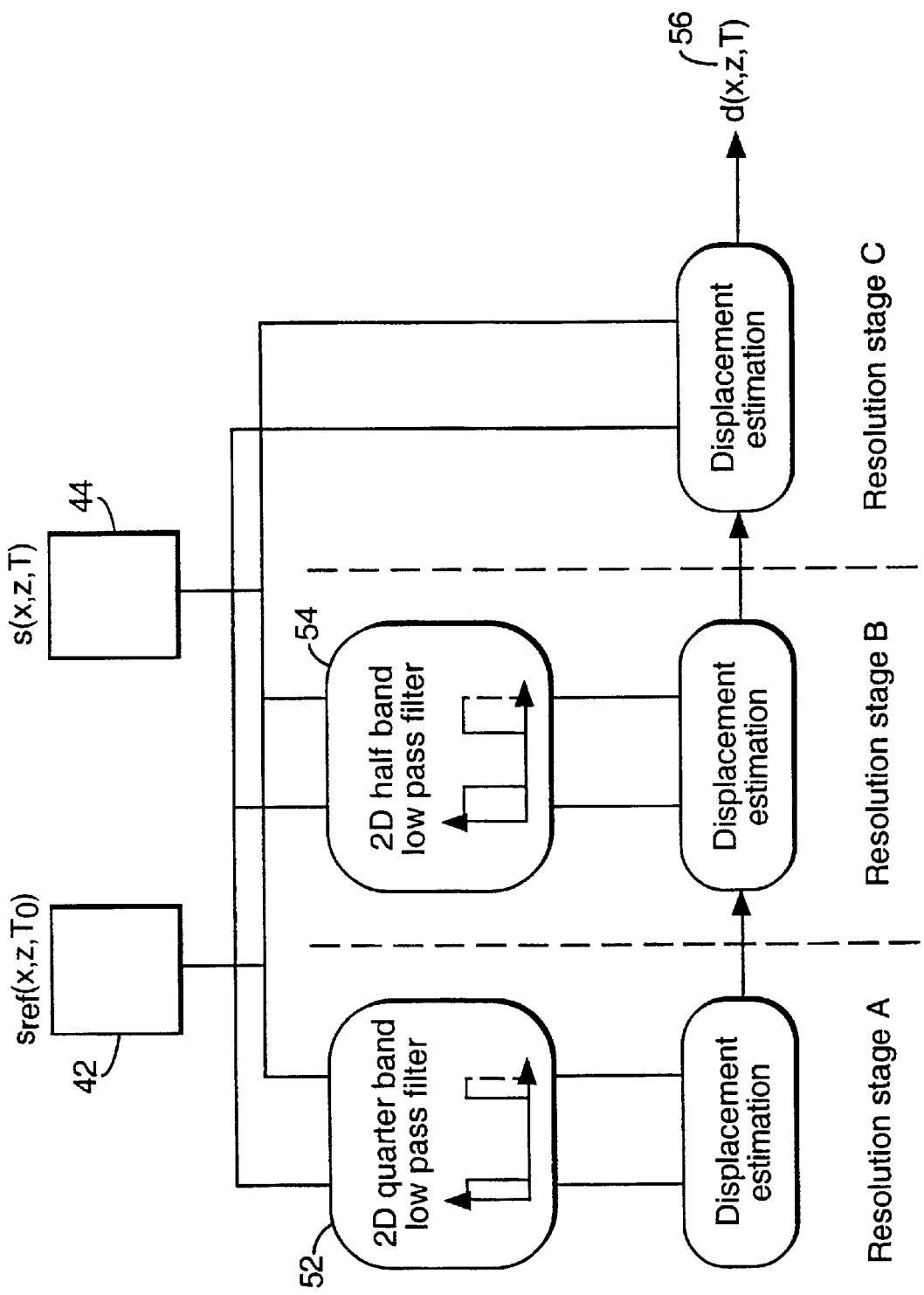
FIG. 4 is a block diagram describing how displacement vectors may be generated using a multiresolution scheme.

The displacement vectors are preferably estimated through the use of a multiresolution scheme, which is shown in more detail in FIG. 4. The first sample set 42 is mathematically represented as $S_{ref}(x,z,T_0)$, where x and z are respectively the horizontal and vertical sample indices and $T_0$ denotes the time instance when the first set of seismic data signals were acquired. Correspondingly, $S(x,z,T)$ is the mathematical representation of the second sample set 44. Next, smoothed versions of the two sample sets are generated by convolving them with a first 2D low pass filter 52.

The bandwidth of the low pass filter in the first stage of the multiresolution scheme will be very narrow and will typically be doubled for each stage until the full bandwidth of the input sample sets is reached. Using, for example, three resolution stages, the sample sets 42 and 44 are filtered at the first stage with a quarter band low pass filter, 52, at the second stage with a half band low pass filter, 54, and finally, at the third stage the sections are not filtered at all.

If the samples have depth sampling intervals of 4 milliseconds, for instance, they will have a Nyquist frequency of 125 Hz. If a three resolution stage scheme is used, the vertical cut-off frequency for the first low-pass 2D filter 52 could be 31.25 Hz and the vertical cut-off frequency for the second low-pass 2D filter 54 could be 62.5 Hz, for instance. Similarly, the first low-pass 2D filter 52 could have a horizontal cut-off frequency equal to one quarter of the horizontal Nyquist frequency and the second low-pass filter 54 could have a horizontal cut-off frequency equal to one half of the horizontal Nyquist frequency, for instance. The low-pass 2D filters 52 and 54 are typically separable and have the same coefficients in both directions, although different responses in the vertical and horizontal directions are also possible.

At each stage in the multiresolution scheme, the prepared sample sets are used to calculate the following entities in an iterative manner:

$$d_{x,i}(x,z) = \frac{S_{x,i}(x,z) \cdot \Delta S_i(x,z)}{\alpha_R^2 + S_{x,i}^2(x,z) + S_{z,i}^2(x,z)}$$

$$d_{z,i}(x,z) = \frac{S_{z,i}(x,z) \cdot \Delta S_i(x,z)}{\alpha_R^2 + S_{x,i}^2(x,z) + S_{z,i}^2(x,z)}$$

Here, $d_{x,i}(x,z)$ and $d_{z,i}(x,z)$, which make up the displacement vector, $d_i(x,z)$ is the estimated displacement for sample (x,z) in the x-direction and z-direction, respectively, at the iteration i. Note that the time variable T ($T_0$) has been omitted in these equations in order to enhance the readability of the formulas. Further, $S_{x,i}(x,z)$ is the average spatial derivative along the x-direction at iteration i, given by:

$$S_{x,i}(x,z) = \frac{1}{2}\left(\frac{\partial}{\partial z}S_{ref}(x,z) + \frac{\partial}{\partial z}S_i(x,z)\right)$$

where $S_{ref}(x,z)$ is the (according to the resolution stage) filtered version of the first (reference) sample set and $S_i(x,z)$ is the current matched version of the (according to the resolution stage) filtered second sample set. The latter quantity is gained by translating the samples of $S_{i-1}(x,z)$ along the estimated displacement $d_i(x,z)$:

$$S_i(x,z) = I[S_{i-1}(x - d_{z,i-1}(x,z),(z - d_{z,i-1}(x,z))]$$

where I denotes an interpolation operator that is necessary because the displacement vector has subsample precision.

This means that though sample indices have to be integer values, the displacement can be a fraction of a sample width/height. The value of the sample at such an intersample position is gained through interpolation. The interpolation may be bilinear or have a higher order. In the preferred embodiment of the present invention, a bicubic scheme is applied. For the first iteration $S_{i-1}(x,z)=S_o(x,z)$ is the (according to the resolution stage) filtered second sample set, and $d_{i-1}=(d_{x,i-1},d_{z,i-1})=(d_{x,0},d_{z,0})$ is the resulting displacement field from the previous stage. The initial displacement field for the first resolution stage is set to zero.

Correspondingly, the averaged derivative in the z-direction at the $i^{th}$ iteration, $S_{z,i}(x,z)$, is given as:

$$S_{z,i}(x,z) = \frac{1}{2}\left(\frac{\partial}{\partial z}S_{ref}(x,z) + \frac{\partial}{\partial z}S_i(x,z)\right)$$

Furthermore, the matched sample set difference at iteration, i, is obtained as:

$$\Delta S_i(x,z)=S_i(x,z)-S_{ref}(x,z)$$

Finally, $\alpha_R$ is a parameter (that may vary for each resolution stage, R) to control the smoothness of the estimated displacement field. $\alpha_R$ could also be set differently for the horizontal and vertical directions. This may be warranted due to differences in the smoothness of the seismic data signals in the vertical and horizontal directions. Experiments conducted by Applicants however have shown that, at least for certain types of seismic data, it does not appear to be materially beneficial to differ the smoothness values in the vertical and horizontal directions. This technique may be useful, however, for other types of seismic data.

The resulting displacement at the resolution stage, R, is obtained by iterating equations and summing:

$$d_{x,R} = \sum_i^{N_R} d_{x,i}$$

$$d_{z,R} = \sum_i^{N_R} d_{z,i}$$

The final displacement vector field 56 is the resulting displacement field determined by the final resolution stage. The number of iterations at each stage, $N_R$, as well as the smoothness parameter, $\alpha_R$, are input parameters determined by the user of the invention.

Evaluation tests conducted on conventional P-P seismic data have shown that using three resolution stages with 5–10 iterations at each stage can produce preferable results for this type of seismic data signals. The value of the smoothness parameter, $\alpha_R$, has a linear dependency on the amplitude range of the input data. Normalizing the input amplitude range to the interval [0,1] and choosing $\alpha_R$=0.03–0.04 have been found to usually produce a good matching result. The value of the smoothness parameter will depend on the sampling rate of the input data. Increasing the sampling rate through interpolation will increase the smoothness of the data and thus allows a lower smoothness parameter value to be used.

An important aspect of the matching process 10 is how the process behaves in those regions where changes in the seismic data signals are caused by actual changes in the subsurface geologic parameters. At these locations, a significant change in the seismic signal between the first and second set of seismic data signals will be observed. Since the non-rigid matching process 10 operates locally, it will try to compensate for this change by displacing neighboring samples from the second sample set in order to match the amplitudes of the samples from the first sample set. If samples with similar amplitudes do not exist in generally the same area of the first sample set, the displacement estimate will tend to increase and the match will eventually fail. However, it does not make sense to try to displace the samples from more remote areas of the sample set when the changes are due to actual changes in the subsurface geologic parameters, such as in areas of hydrocarbon drainage.

One method for coping with this issue is to establish a threshold absolute value for the displacement vectors (such as 8 samples for seismic data having the above-described sampling rates) and to not allow the absolute value of the displacement vector to exceed this threshold value. Another method for coping with this problem is to discard samples having displacement vectors exceeding this threshold value and to replace them with values from the surrounding neighborhood. In practice, maximum displacements of 3–4 samples (for seismic data having the above-described sampling rates) appear to indicate acceptable matching results while displacements exceeding these values may be questioned.

It should be further noted that the derivatives used to calculate $S_{x,i}(x,z)$ and $S_{z,i}(x,z)$ are preferably approximated as finite differences or with a polynomial scheme of higher order. In the preferred embodiment of the present invention, a cubic scheme is applied.

In certain cases it may be necessary to impose additional smoothness on the set of displacement vectors, which are collectively referred to as the displacement field.

This can be done by averaging the displacement vectors over an appropriate number of neighboring samples or by applying another appropriate spatial low pass filter. Further it should be stressed that alternative choices of interpolation schemes and filter order could be used in connection with the inventive matching process 10 and these can be expected to lead to slightly different estimates of the displacement vectors.

Referring again to FIG. 2, it can be seen that if a multiresolution displacement estimation scheme is used in the matching process 10 and this process is not in its final displacement estimation stage, the sample sets will be directed by switch 22 to be filtered by an appropriate 2D low pass filter. The appropriately filtered sample sets will then be subjected to a (preferably iterative) displacement vector generation step 26, described above. If this is not the final resolution stage, switch 28 returns the estimated displacement field to be used as an input to the next stage of the displacement vector estimation process.

When the final resolution stage is complete, the final displacement field 56, comprising a plurality of displacement vectors, is transferred to the translation step 30 along with the unfiltered second sample set 44. The translation step consists simply of translating the samples of the second sample set 44 along the displacement vectors in the final displacement field 56. Mathematically, this can be expressed as:

$$S_{matched}(x,z)=I[S(x-d_x(x,z),z-d_z(x,z))]$$

The set of seismic data signals produced by this translation step 30 is then optionally subjected to postprocessing procedures 32, such as a final low-pass filtering step. This filtering step may be necessary to reduce high frequency signal components that have occurred due to the nonlinear nature of the matching procedure.

Although 2D algorithms have been used to describe this embodiment of the inventive matching process 10, this has been done primarily to make the inventive method easier to understand. In particular, it is significantly easier to create figures showing the displacement vectors and sample translation process in two dimensions. Another embodiment of the matching process 10 involves generating the components of the displacement field in three dimensions. In this embodiment of the matching process 10, the samples are translated in two directions horizontally (x,y) as well as vertically (z). This 3D method is a straightforward extension of the 2D embodiment described above and is intended to fall squarely within the scope of the claims below.

Finally, the results may be written into the new non-rigid matched cube, $S_{matched}(x,y,z,T)$ and the scheme may proceed by extracting the next sections from the input seismic data signal volumes. The so generated matched cube may then be used in other postprocessing procedures 32 such as attribute extraction and classification. In particular, it is useful to generate a matched cube difference:

$$\Delta S_{matched}(x,y,z,T) = S_{matched}(x,y,z,T) - S_{ref}(x,y,z,T_0)$$

Such a cube difference will improve the contrast between the regions in the subsurface volume where a drainage of hydrocarbons in a reservoir has occurred and regions that are unchanged with respect to parameters triggering the seismic response. Further, it should be noted that the resulting displacement cube itself bears valuable information that may be exploited in further interpretation and processing. It may, for instance, be useful in identifying and quantifying differences between the acquisition parameters used to collect the first and second sets of seismic data signals, such as lateral shifts in the source and/or receiver locations used to collect the seismic data.

Additional postprocessing procedures 32 such as plotting or displaying the results of the previous steps can also be performed during the matching process 10. During the postprocessing procedures 32, it is also possible to convert the seismic image of the subsurface area into a set of seismic data signals which can then be merged with other seismic data signals. The matching process 10 can, in this way, be used to harmonize two sets of seismic data signals (such as an older "legacy" set of seismic data signals and a newly acquired set of seismic data signals) before the sets of seismic data signals are merged and processed.

The inventive matching process 10 can be applied at many different points during the processing and interpreting of seismic data signals. Probably the most critical choices to be made are whether the first seismic data signals set 12 and the second seismic data signals set 14 will comprise stacked or unstacked seismic data signals and whether migrated or unmigrated seismic data signals will be used. Stacking substantially reduces the quantity of data to be processed and often substantially increases the signal to noise ratio of the data. This will often increase the simplicity of performing the matching process 10 and increase the quality of the results obtained. Migration is also typically considered one of the major steps in processing seismic data signals. In some cases, historical or "legacy" seismic data signals will be available that have already been migrated, but the parameters used to migrate the data will be unavailable. This may make it difficult to process a new set of seismic data signals so that it will closely resemble the old set of seismic data signals. In this case, it may be preferable to perform the matching process 10 on the raw unmigrated data or to remigrate the old data using known migration parameters before performing the matching process between the old seismic data signals and the new seismic data signals.

Figure 5A:
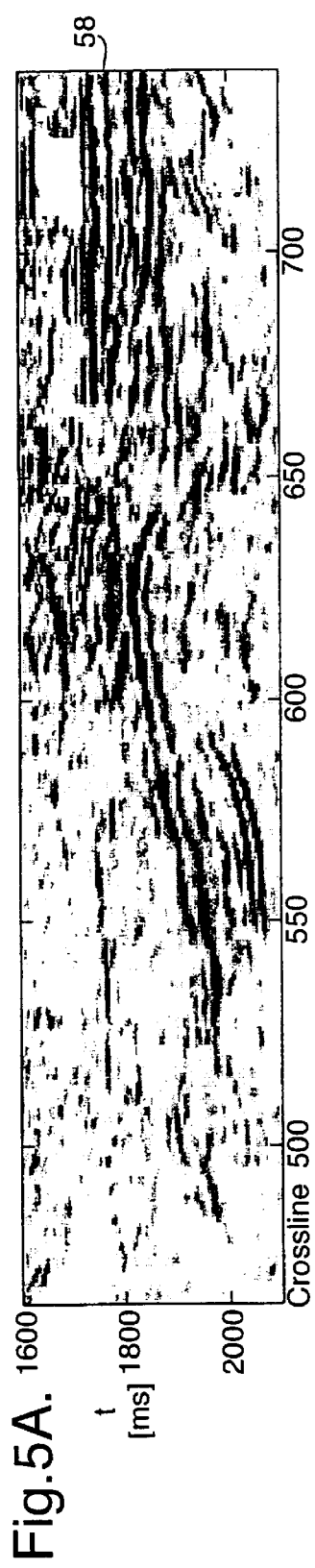
FIGS. 5A, 5B, and 5C are three inline seismic section images from the same subsurface area.

FIG. 5A is a seismic section from a seismic survey that was conducted in 1985. FIG. 5C is a seismic section of the same subsurface area from a seismic survey that was conducted in 1995. FIG. 5C has been preprocessed to attempt to remove any known noise such as different acquisition or processing parameters that would change the image from the seismic section shown in FIG. 5A. It can be seen that substantial differences still exist between these sections. The magnitude of these differences is shown in FIG. 6A. Those of ordinary skill in the art will understand that many of the differences between the seismic sections shown in FIGS. 5A and 5C can be attributed primarily to noise such as acquisition or processing artifact effects, rather than to detectable changes in geologic parameters of the subsurface over this ten year period.

Figure 5B:
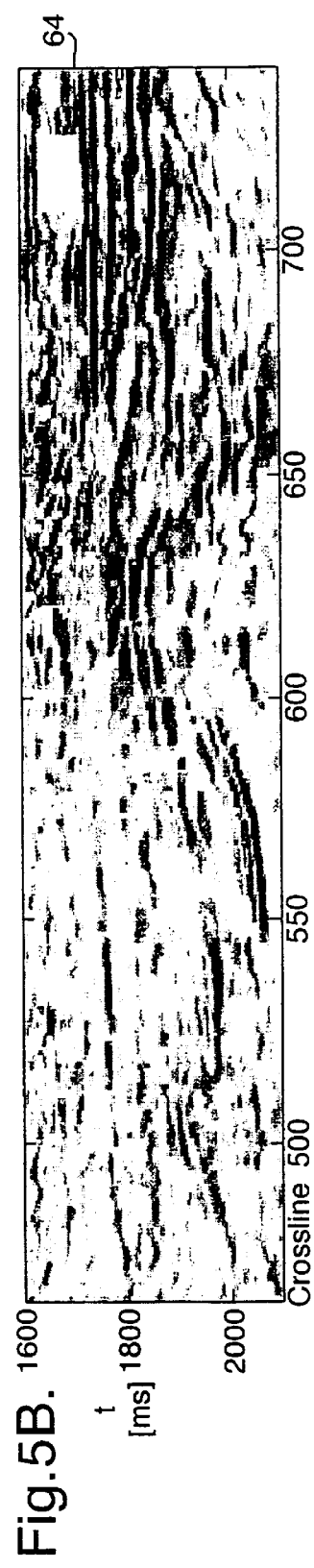
Figure 5C:
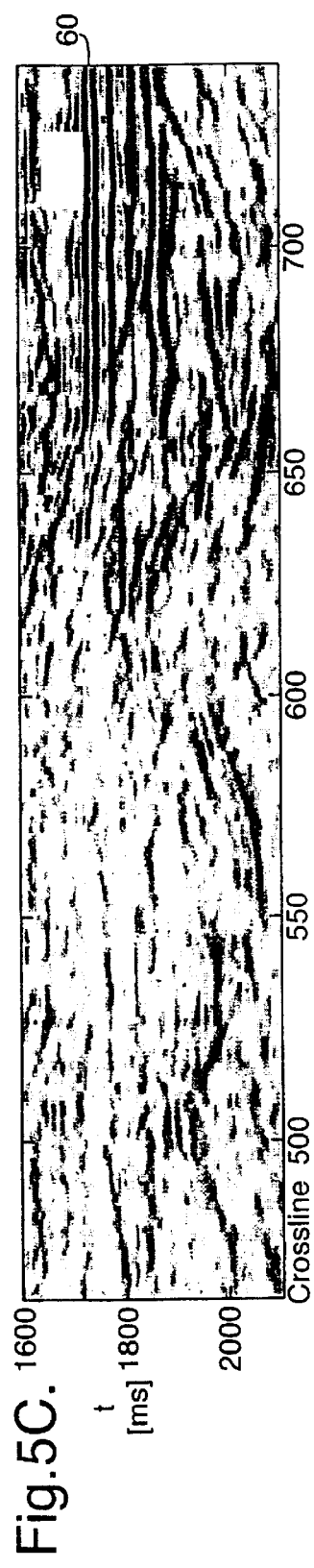
Figure 6A:
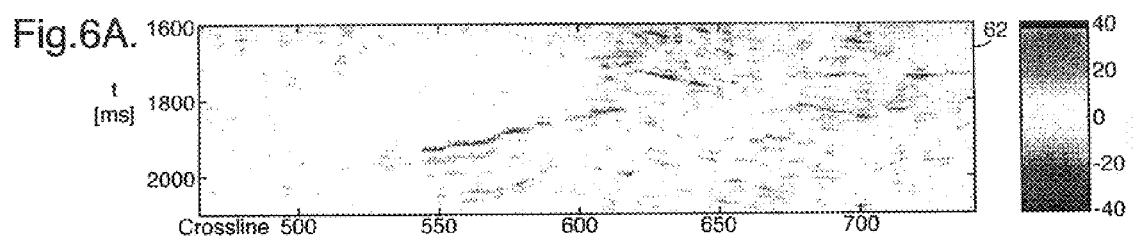
FIGS. 6A, 6B, and 6C are displays showing differences between seismic sections and the absolute value of the displacement vectors used to more closely match one seismic section with another seismic section.
Figure 6B:
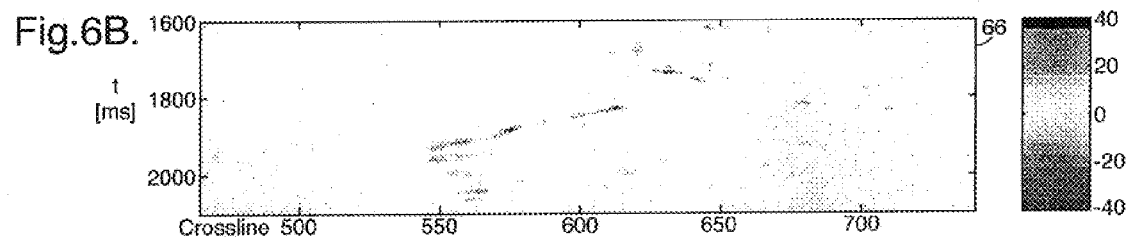
Figure 6C:
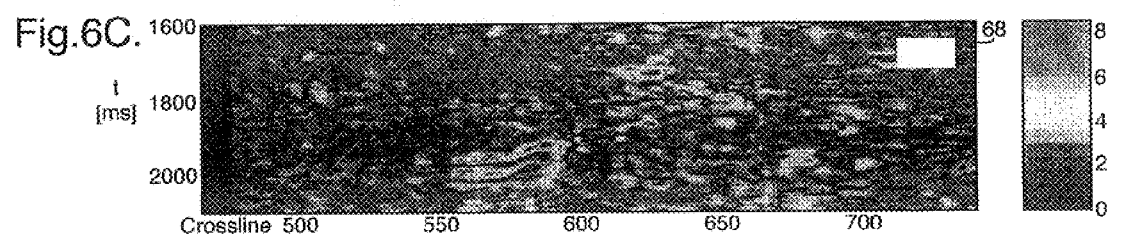

FIG. 5B shows a seismic section that was produced by matching the seismic section shown in FIG. 5C with the seismic section shown in FIG. 5A in accordance with the present invention. It can be seen that the magnitude of differences between the seismic sections shown in FIGS. 5B and 5C are substantially reduced (attenuated) when compared to the differences between the seismic sections shown in FIGS. 5A and 5B. FIG. 6B graphically displays the differences between FIGS. 5B and 5C. The changes shown in FIG. 6B are much more likely to represent changes in the seismic data signals associated with true changes in geologic parameters rather than noise such as acquisition or processing artifact effects. An interpreter could use the information in FIG. 6B, for instance, to determine where best to place a new production well or where to place injector wells for enhanced oil recovery. FIG. 6C shows the absolute value of the displacement vectors used to transform the seismic section shown in FIG. 5C into the seismic section shown in FIG. 5B. It can be seen that the vast majority of samples from the second set of seismic data signals were moved less than 4 samples to obtain the section shown in FIG. 5B.

The inventive matching process 10 will typically be implemented on a machine such as an appropriately programmed computer system, i.e. a Sun workstation, and the sections shown in FIGS. 5 and 6 will typically be displayed on a computer monitor or a color plotter. The computer system will normally receive instructions regarding how to implement the inventive method by reading a pre-recorded computer readable medium, such as a floppy disk or CD-ROM, that contains recorded software instructions.

Finally, it should be stressed that it will be apparent for those skilled in the art that various alterations can be made to the above described embodiment without departing from the scope of the present invention as determined by the claims. For instance, instead of matching the migrated seismic volumes of two vintages, the invention can be equally applied on prestack data, data before migration, or to more sophisticated data such as attribute cubes (e.g. inverted acoustic impedance cubes, porosity cubes) that are derived from the individual 3D seismic volumes. Further, it is to be understood that processing of 2D data entities i.e. an inline section, a crossline section, random lines, time (depth) slices, or time (depth) horizons is merely a special case of 3D processing and therefore inherently included within the current invention. The process can also be used with seismic data signals other than conventional P-P transmission mode data, such as P-S transmission mode seismic data signals, multicomponent seismic data signals, VSP seismic data signals and borehole seismic data signals.

The present invention includes any novel feature or novel combination of features disclosed herein, either explicitly or implicitly

What is claimed is:

1. A method of processing first and second sets of seismic data signals obtained from the same subsurface area, the method comprising the steps of:
    decomposing said first and second sets of seismic data signals into first and second sample sets;
    generating displacement vectors indicating directions and amounts samples from said second sample set may be translated to better match samples from said first sample set; and
    translating said samples from said second sample set along said displacement vectors to produce a seismic image of the subsurface area.

2. A method as claimed in claim 1, in which said displacement vectors are generated using a plurality of resolution stages and said first and second sample sets are low pass filtered before said displacement vectors are generated during the first of said resolution stages.

3. A method as claimed in claim 2, in which three or more resolution stages are used.

4. A method as claimed in claim 1, in which said displacement vectors are generated by sequentially generating a plurality of incrementally updated estimated sample displacements in an iterative manner.

5. A method as claimed in claim 4, in which from 5 to 10 iterations are used to generate a particular set of displacement vectors.

6. A method as claimed in claim 1, further including the step of preprocessing said first set of seismic data signals or said second set of seismic data signals using one or more of the following processes: amplitude scaling; bandpass filtering; lateral interpolation; binning; multiple suppression; statics reduction; frequency response matching; prestack migration; stacking; poststack migration; and attribute generation.

7. A method as claimed in claim 1, further including the step of postprocessing said image of the subsurface area using one or more of the following processes: low-pass filtering; prestack migration; stacking; poststack migration; data reduction; and attribute generation.

8. A method as claimed in claim 1, in which said sets of seismic data signals are 2D sections extracted from larger 3D sets of seismic data signals.

9. A method as claimed in claim 8, in which said 2D sections can be characterized as either inline, crossline, curvilinear line, random line, time slice, or time horizon sections.

10. A method as claimed in claim 1, further including the step of calculating a difference between a seismic image obtained from said first set of seismic data and said seismic image of the subsurface area.

11. A method as claimed in claim 10, further including the step of graphically displaying said difference.

12. A method as claimed in claim 1, further including the step of graphically displaying said displacement vectors or said seismic image of the subsurface area.

13. A method as claimed in claim 1, in which said displacement vectors are derived using a formula of the form:

$$d_{x,i}(x, z) = \frac{S_{x,i}(x, z) \cdot \Delta S_i(x, z)}{\alpha_R^2 + S_{x,i}^2(x, z) + S_{z,i}^2(x, z)}$$

$$d_{z,i}(x, z) = \frac{S_{z,i}(x, z) \cdot \Delta S_i(x, z)}{\alpha_R^2 + S_{x,i}^2(x, z) + S_{z,i}^2(x, z)}$$

where:

$$S_{x,i}(x, z) = \frac{1}{2}\left(\frac{\partial}{\partial x}S_{ref}(x, z) + \frac{\partial}{\partial x}S_i(x, z)\right)$$

$$S_{z,i}(x, z) = \frac{1}{2}\left(\frac{\partial}{\partial z}S_{ref}(x, z) + \frac{\partial}{\partial z}S_i(x, z)\right)$$

$$\Delta S_i(x,z) = S_i(x,z) - S_{ref}(x,z).$$

14. A method as claimed in claim 13, in which $S_{x,i}$ and $S_{z,i}$ are approximated using a cubic polynomial approximation scheme.

15. A method as claimed in 14, in which the value of smoothness parameter, $\alpha_R$, is between 0.03 and 0.04 if said first and second sets of seismic data signals have amplitude ranges normalized to the interval [0,1].

16. A method as claimed in claim 1, in which said displacement vectors are spatially filtered before said samples from said second sample set are translated along said displacement vectors.

17. A method as claimed in claim 1, in which said subsurface area comprises a hydrocarbon reservoir and said second set of seismic data signals were acquired later than said first set of seismic data signals.

18. A method according to claim 17, wherein said seismic image of said subsurface area is compared to a seismic image of the hydrocarbon reservoir obtained from said first set of seismic data signals to monitor fluid movements within the hydrocarbon reservoir.

19. A method as claimed in claim 1, in which said displacement vectors are prevented from exceeding a threshold value.

20. A machine for producing a seismic image of a subsurface area from first and second sets of seismic data signals obtained from the subsurface area, said machine comprising:
    means for decomposing said first and second sets of seismic data signals into first and second sample sets;
    means for generating displacement vectors indicating directions and amounts samples from said second sample set may be translated to better match samples from said first sample set; and
    means for translating said samples from said second sample set along said displacement vectors to produce the seismic image of said subsurface area.

* * * * *